(12) United States Patent
Wessman

(10) Patent No.: US 6,705,418 B2
(45) Date of Patent: Mar. 16, 2004

(54) ARRANGEMENT FOR PROVIDING A COMPACT BATTERY WITH AUTONOMOUS COOLING

(75) Inventor: Björn Wessman, Torslanda (SE)

(73) Assignee: Volvo Car Corporation, Gothenburg (SE)

(*) Notice: Subject to any disclaimer, the term of this patent is extended or adjusted under 35 U.S.C. 154(b) by 116 days.

(21) Appl. No.: 09/728,517

(22) Filed: Nov. 30, 2000

(65) Prior Publication Data
US 2002/0064707 A1 May 30, 2002

Related U.S. Application Data
(60) Provisional application No. 60/245,090, filed on Oct. 31, 2000.

(51) Int. Cl.[7] .................. B60R 16/04; H01M 10/50; H01M 6/42
(52) U.S. Cl. .................. 180/68.5; 429/120; 429/159
(58) Field of Search .................. 180/68.5, 68.1; 429/120, 98, 99, 100, 11, 18, 158, 159, 123; 320/16, 17

(56) References Cited

U.S. PATENT DOCUMENTS

| | | | | |
|---|---|---|---|---|
| 3,603,599 A | * | 9/1971 | Laird | 277/53 |
| 4,707,420 A | * | 11/1987 | Wedlake | 429/11 |
| 5,035,964 A | * | 7/1991 | Levinson | 429/120 |
| 5,187,030 A | * | 2/1993 | Firmin et al. | 429/120 |
| 5,320,190 A | * | 6/1994 | Naumann et al. | 180/68.2 |
| 5,663,683 A | * | 9/1997 | McCandless | 330/286 |
| 5,948,556 A | * | 9/1999 | Hall et al. | 429/7 |
| 6,010,800 A | * | 1/2000 | Stadnick et al. | 429/120 |
| 6,106,972 A | * | 8/2000 | Kokubo et al. | 429/120 |
| 6,152,096 A | * | 11/2000 | Setsuda | 123/184.21 |
| 6,174,618 B1 | * | 1/2001 | Nishiyama et al. | 429/99 |
| 6,220,383 B1 | * | 4/2001 | Muraki et al. | 180/68.5 |
| 6,255,015 B1 | * | 7/2001 | Corrigan et al. | 429/149 |
| 6,315,069 B1 | * | 11/2001 | Suba et al. | 180/68.5 |

FOREIGN PATENT DOCUMENTS

| | | | | |
|---|---|---|---|---|
| FR | 2199101 | * | 4/1974 | 429/120 |
| JP | 405169981 A | * | 7/1993 | 180/65.1 |
| JP | 9266016 | * | 10/1997 | 429/62 |

* cited by examiner

Primary Examiner—Brian L. Johnson
Assistant Examiner—Gerald Klebe
(74) Attorney, Agent, or Firm—Fitch, Even, Tabin & Flannery

(57) ABSTRACT

Arrangement for a compact battery and cooling system. The arrangement includes a plurality of elongate battery cells, each battery cell having a longitudinal axis and a hexagonal cross-sectional shape in a plane oriented substantially perpendicular to the longitudinal axis. The cells are parallelly oriented, each to the others, within a battery housing. Preferably, the cells are arranged in a honeycomb configuration with opposed faces of adjacent battery cells proximately located one to the other in face-to-face relationship. At least one substantially hexagonally shaped cooling channel is provided at an interior location within the plurality of battery cells.

8 Claims, 12 Drawing Sheets

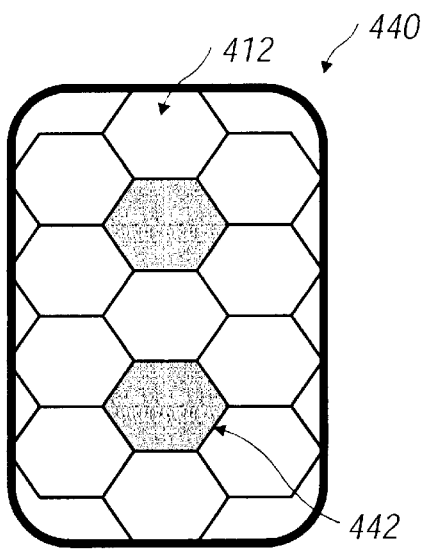
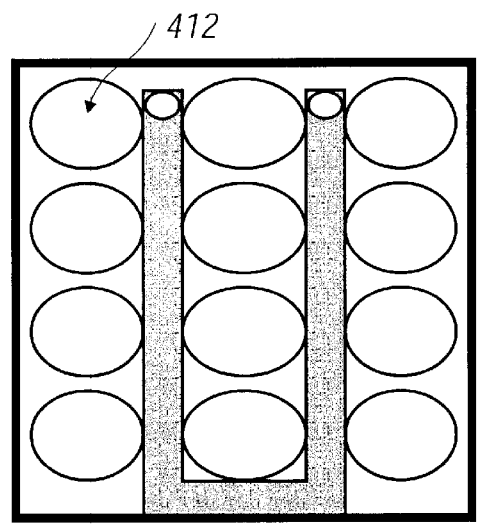
FIG. 8a    FIG. 8b
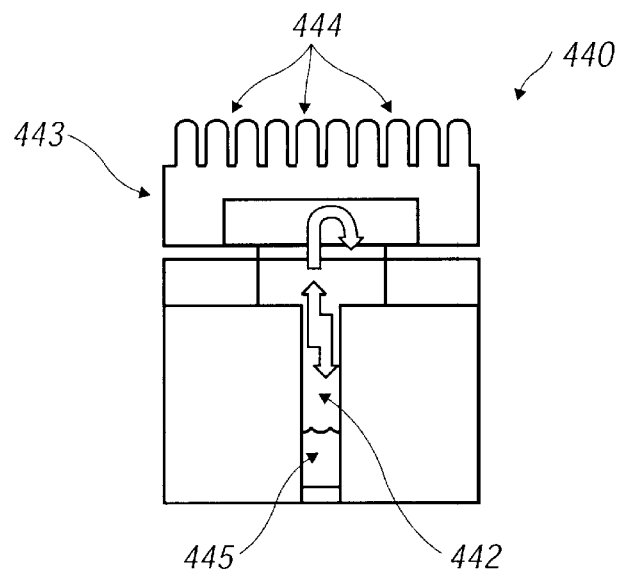
FIG. 8c

ARRANGEMENT FOR PROVIDING A COMPACT BATTERY WITH AUTONOMOUS COOLING

RELATED APPLICATION(S)

This patent application claims priority to U.S. Provisional Application No. 60/245,090 filed Oct. 31, 2000 and entitled HYBRID ELECTRIC VEHICLE. Said application in its entirety is hereby expressly incorporated by reference into the present application.

DESCRIPTION

1. Industrial Applicability

The present invention finds applicability in the transportation industries, and more specifically private and commercial vehicles. Of particular importance is the invention's incorporation into hybrid electric vehicles.

2. Background Art

Generally, a hybrid electric vehicle combines electric propulsion with traditional internal combustion engine propulsion to achieve enhanced fuel economy and/or lower exhaust emissions. Electric propulsion has typically been generated through the use of batteries and electric motors. Such an electric propulsion system provides the desirable characteristics of high torque at low speeds, high efficiency, and the opportunity to regeneratively capture otherwise lost braking energy. Propulsion from an internal combustion engine provides high energy density, and enjoys an existing infrastructure and lower costs due to economies of scale. By combining the two propulsive systems with a proper control strategy, the result is a reduction in the use of each device in its less efficient range. Furthermore, and as shown in FIG. 1 regarding a parallel hybrid configuration, the combination of a downsized engine with an electric propulsion system into a minimal hybrid electric vehicle results in a better utilization of the engine, which improves fuel consumption. Furthermore, the electric motor and battery can compensate for reduction in the engine size.

In typical configurations, the combination of the two types of propulsion systems (internal combustion and electric) is usually characterized as either series or parallel hybrid systems. In a pure series hybrid propulsion system, only the electric motor(s) are in direct connection with the drive train and the engine is used to generate electricity which is fed to the electric motor(s). The advantage of this type of system is that the engine can be controlled independently of driving conditions and can therefore be consistently run in its optimum efficiency and low emission ranges. A key disadvantage to the series arrangement is the loss in energy experienced because of the inefficiencies associated with full conversion of the engine output to electricity.

In a pure parallel hybrid propulsion system, both the engine and the electric motor(s) are directly connected to the drive train and either one may independently drive the vehicle. Because there is a direct mechanical connection between the engine and the drive train in a parallel hybrid propulsion system, less energy is lost through conversion to electricity compared to a series hybrid propulsion system. The operating point for the engine, however, can not always be chosen with full freedom.

The two hybrid propulsion systems can be combined into either a switching hybrid propulsion system or a power-split hybrid propulsion system. A switching hybrid propulsion system typically includes an engine, a generator, a motor and a clutch. The engine is typically connected to the generator. The generator is connected through a clutch to the drive train. The motor is connected to the drive train between the clutch and the drive train. The clutch can be operated to allow series or parallel hybrid propulsion.

A power-split hybrid system, as is exemplarily employed with respect to the present invention, includes an engine, a generator and a motor. The engine, output is "split" by a planetary gear set into a series path from the engine to the generator and a parallel path from the engine directly to the power train. In a power-split hybrid system, the engine speed can be controlled by varying the power split to the generator by way of the series path, while maintaining the mechanical connection between the engine and drive train through the parallel path. The motor augments the engine on the parallel path in a similar manner as a traction motor in a pure parallel hybrid propulsion system, and provides an opportunity to use energy directly through the series path, thereby reducing the losses associated with converting the electrical energy into, and out of chemical energy at the battery.

In a typical power-split hybrid system, the generator is usually connected to the sun gear of the planetary gear set. The engine is connected to the planetary carrier and the output gears (usually including an output shaft and gears for interconnection with the motor and the wheel-powering, final drive train) are connected to the ring gear. In such a configuration, the power-split hybrid system can generally be operated in four different modes; one electric mode and three hybrid modes.

In the electric mode, the power-split hybrid system propels the vehicle utilizing only stored electrical energy and the engine is turned off. The tractive torque is supplied from the motor, the generator, or a combination of both. This is the preferred mode when the desired power is low enough that it can be produced more efficiently by the electrical system than by the engine and when the battery is sufficiently charged. This is also a preferred mode for reverse driving because the engine cannot provide reverse torque to the power train in this configuration.

In the parallel hybrid mode, the engine is operating and the generator is locked. By doing this, a fixed relationship between the speed of the engine and the vehicle speed is established. The motor operates as either a motor to provide tractive torque to supplement the engine's power, or can be operated to produce electricity as a generator. This is a preferred mode whenever the required power demand requires engine operation and the required driving power is approximately equal to an optimized operating condition of the engine. This mode is especially suitable for cruising speeds exclusively maintainable by the small internal combustion engine fitted to the hybrid electric vehicle.

In a positive split hybrid mode, the engine is on and its power is split between a direct mechanical path to the drive train and an electrical path through the generator. The engine speed in this mode is typically higher than the engine speed in the parallel mode, thus deriving higher engine power. The electrical energy produced by the generator can flow to the battery for storage or to the motor for immediate utilization. In the positive split mode, the motor can be operated as either a motor to provide tractive torque to supplement the engine's power or to produce electricity supplementally with the generator. This is the preferred mode whenever high engine power is required for tractive powering of the vehicle, such as when high magnitude acceleration is called for, as in passing or uphill ascents. This is also a preferred mode when the battery is charging.

In a negative split hybrid mode, the engine is in operation and the generator is being used as a motor against the engine to reduce its speed. Consequently, engine speed, and therefore engine power, are lower than in parallel mode. If needed, the motor can also be operated to provide tractive torque to the drive train or to generate electricity therefrom. This mode is typically never preferred due to increased losses at the generator and planetary gear system, but will be utilized when engine power is required to be decreased below that which would otherwise be produced in parallel mode. This situation will typically be brought about because the battery is in a well charged condition and/or there is low tractive power demand. In this regard, whether operating as a generator or motor, the toque output of the generator is always of the same sense (+/−); that is, having a torque that is always directionally opposed to that of the engine. The sign of the speed of the generator, however, alternates between negative and positive values depending upon the direction of rotation of its rotary shaft, which corresponds with generator vs. motor modes. Because power is dependent upon the sense of the speed (torque remains of the same sense), the power will be considered to be positive when the generator is acting as a generator and negative when the generator is acting as a motor.

When desiring to slow the speed of the engine, the current being supplied to the generator is changed causing the speed of the generator to slow. Through the planetary gear set, this in turn slows the engine. This effect is accomplished because the resistive force acting against the torque of the generator is less at the engine than at the drive shaft which is connected to the wheels and is being influenced by the entire mass of the vehicle. It should be appreciated that the change in speed of the generator is not equal, but instead proportional to that of the engine because of gearing ratios involved within the connection therebetween.

In electric and hybrid electric vehicles, large capacity electricity storage device(s), usually in the form of battery packs, are required. By conventional design, these batteries include a plurality of cylindrical battery cells that are collectively utilized to obtain sufficient performance and range in the vehicle. Typically, batteries are positioned within the vehicle in a compartment configured to protect against damage and to prevent the cells, and mostly their acidic contents, from causing injury or damage, especially in the event of a crash. When stored in these typically confined compartment(s), heat buildup generated from use and/or charging affects the endurance of the batteries, and in some circumstances can destroy individual battery cells. Traditional cooling of the batteries and the battery compartment requires increasing the volume of the compartment for air cooling and/or running cooling hoses to external radiators.

Typically, to achieve a smooth engine start in a hybrid electric vehicle in which the engine is mechanically interconnected with the drive wheels, the start of engine fuel injection and ignition are made at revolutionary speeds above any mechanical resonance speeds of the drive train. Additionally, at full take-off acceleration, any delay in the engine's production of power typically decreases engine performance. Still further, to achieve smooth driving characteristics and obtain low fuel consumption, the engine torque and speed change rates must be limited. At full take-off, this usually results in an increased time period for the engine to reach maximum power, and all of these conditions deteriorate acceleration performance of the vehicle.

As can be appreciated, the engine is not always running during vehicle operation. If the engine is stopped for a sufficiently long period during the operation of the vehicle, the exhaust system catalyst may cool down too much, and to such a degree that a temporary, but significant increase in exhaust emissions occur upon restart and until the catalyst once again warms to its effective temperature.

In another aspect, the battery state-of-charge (SOC) in a hybrid electric vehicle is typically controlled using SOC feedback control. When applying SOC feedback control, however, and when the vehicle is operating in a low velocity region, the SOC feedback control tends to grow unstable as velocity increases. Instability also occurs when the vehicle is operating at high velocity and the velocity of the vehicle then decreases. The same instability or weakness can still occur even when using "feed-forward" type estimating of required tractive force; the same being a typical complement to SOC feedback control. This is particularly true at low vehicle velocities with velocity increases and at high vehicle velocities with velocity decreases. Even when properly designed, the SOC feedback control can also be weak at full take-off.

In a typical power-split hybrid electric propulsion arrangement, the control strategy advantageously involves operating the engine along optimum efficiency torque vs. speed curves. A trade-off exists between traction force performance and fuel economy which, for optimization, typically requires selection of a particular gear ratio between the engine and the wheels that causes the engine to deliver more power than is needed for vehicle propulsion. This generally occurs at cruising in parallel mode, or near constant vehicle velocity conditions. Operation under these conditions can, sometimes, cause the battery and charging system to reject energy being presented thereto from the engine. This problem is generally solved by decreasing or limiting the engine output power by entering negative split mode which entails using the generator as a motor to control the engine to a decreased speed. Such control allows the engine to follow an optimum curve at reduced engine output power.

Use of the generator as a motor gives rise to a power circulation in the power-train which leads to undesirable energy losses at the generator, motor, inverters and/or planetary gear set. These energy losses may be manifest as heat generation which indicates that most efficient use is not being made of the installed drive train.

In a power-split hybrid propulsion system having planetary gear set(s) and utilizing a generator lock-up device, a harshness in ride occurs when the generator lock-up device is engaged or released. This is due primarily to the difference in how engine torque is estimated when the vehicle is in different operating modes. Typically, when the generator is locked up, engine torque is estimated from the combustion control process of the engine. When the generator is free, as in split mode, however, engine torque is estimated from the generator torque control process. The difference in values of these two estimating techniques gives rise to what usually amounts to a variation in operating torque between the engine and generator when the lock-up device is engaged or disengaged, thereby creating harshness in the vehicle's operation, usually manifest as abrupt changes or jerkiness in the vehicle's ride.

As earlier indicated, the generator is typically used to control the engine in power-split hybrid mode. This is usually accomplished by employing a generator having maximum torque capabilities substantially greater than the engine's maximum torque that is transmittable to the planetary gear system. Failure to have such a control margin can result in generator over-speed and possible damage to the propulsion system. Such a control margin means, however, that the engine and generator are not fully exploited at full capacity acceleration.

Several deficiencies associated with the use of known hybrid electric vehicle designs and methods of operating the same have been described hereinabove. Several inventive arrangements and methods for operating hybrid electric vehicles are described hereinbelow that minimize, or remedy these deficient aspects of known designs, and/or provide benefits, in and of themselves, to the user. These new, improved and otherwise potentiated solutions are described in greater detail hereinbelow with respect to several alternative embodiments of the present invention.

DISCLOSURE OF THE INVENTION

In a first aspect, an arrangement for a compact battery and cooling system therefore is disclosed. The arrangement includes a plurality of elongate battery cells, each battery cell having a longitudinal axis and a hexagonal cross-sectional shape in a plane oriented substantially perpendicular to the longitudinal axis. The cells are parallelly oriented, each to the others, within a battery housing. Preferably, the cells are arranged in a honeycomb configuration with opposed faces of adjacent battery cells proximately located one to the other in face-to-face relationship. At least one substantially hexagonally shaped cooling channel is provided at an interior location within the plurality of battery cells.

In a second aspect, a method for potentiating an engine's power contribution to a hybrid electric vehicle's performance in a take-off operating condition is disclosed. Normally, fuel injection to, and ignition at the engine are only commenced when the engine is operating at a speed exceeding the resonance speed of the drive train to reduce engine start harshness; such resonance speeds of the drive train being dictated, at least in part, by transmission backlash, softness and the like. During high driver acceleration demands, however, ignition and the injection of fuel is desirably started as early as possible to potentiate output power and acceleration.

In a third aspect, a method for maintaining a catalyst of an emissions system in a hybrid electric vehicle in an operative condition is disclosed. The method includes sensing that an engine of a hybrid electric vehicle has stopped operating. A time period is predicted after which a catalyst of an emissions system associated with the engine will cool to a light-off temperature below which the catalyst becomes ineffective. The predicting step is based on known qualities of the catalyst and ambient conditions in which the vehicle is being operated. The engine is restarted when the predicted time period has expired thereby maintaining the catalyst at temperatures in excess of the light-off temperature.

In a fourth aspect, a method for minimizing driver perceptible drive train disturbances during take-off in a hybrid electric vehicle when maximized power is often desired is disclosed. The method includes sensing an actual state-of-charge (SOC) value of a battery in a hybrid electric vehicle and a traveling velocity of the vehicle during take-off operation. The sensed actual SOC value is compared with a SOC reference value and computing a delta SOC value as a difference therebetween. A velocity-based SOC calibration factor is looked up that corresponds to the traveling velocity of the vehicle. A combination is utilized of the delta SOC value and the SOC calibration factor as a SOC feedback engine speed control instruction to an engine controller of the hybrid electric vehicle. A driver's desired vehicular acceleration is sensed based on accelerator position. Maximum possible engine power generatable at the sensed vehicle speed is determined, as is a required power value from the power train of the vehicle to meet the driver's desired vehicular acceleration. The maximum possible engine power generatable at the sensed vehicle speed is compared with the required power value and computing a delta power train requirement value as a difference therebetween. A velocity-based and accelerator position-based power calibration factor is looked-up that corresponds to the traveling velocity of the vehicle and the accelerator position. A combination of the delta power train requirement value and the power calibration factor is utilized as a power requirement feed-forward engine speed control instruction to an engine controller of the hybrid electric vehicle.

In a fifth aspect, a method for optimizing the operational efficiency of a hybrid electric vehicle is disclosed. The method comprises operating an engine of a hybrid electric vehicle preferentially on an optimized power curve of the engine for maximizing the efficiency of the engine and sensing a state-of-charge (SOC) condition of a battery of the hybrid electric vehicle being at a preferential value indicative of no additional charging being desired. The running torque of the engine is reduced below the optimized torque curve to a point that the power produced by the engine is substantially equal to the power demanded for driving the hybrid electric vehicle.

In a sixth aspect, a method for calibrating and synchronizing sensed operating torques of an engine and a generator in a planetary gear based hybrid electric vehicle is disclosed. The method includes providing a sensor that detects the operational torque of an engine of a hybrid electric vehicle at the engine's interface with a planetary gear system of the hybrid electric vehicle. A sensor is provided that detects the operational torque of a generator of a hybrid electric vehicle at the motor's interface with the planetary gear system of the hybrid electric vehicle. The planetary gear system of the hybrid electric vehicle is operated in a split mode so that the generator is directly linked to the engine and a reading of the sensor that detects the operational torque of the generator may be used to compute the operating torque of the engine. Paired values of sensed operational torques of the engine and the generator at like times are recorded. Each pair of recorded values are arithmetically processed and a calibrating value is computed therebetween. The sensing and recording of paired values is repeated at the same sensed generator and engine speeds and torques thereby enabling the calculation of computed average calibrating values at each of the particular sensed generator speeds suitable for subsequent utilization in computing corresponding engine torques in the future. The engine and the generator are controlled utilizing the average calibrating value at future times of transition between power-split mode and parallel mode of the planetary gear system so that the engine is substantially synchronized with the generator at the time of direct linkage across the planetary gear arrangement thereby avoiding driver detectible irregularities in the performance of the power train of the hybrid electric vehicle.

In a seventh aspect, a method for potentiating the utilizable torque output capacity of a hybrid electric vehicle is disclosed. The method includes controlling operation of an engine of a hybrid electric vehicle using a generator, the engine and generator being interconnected through a planetary gear system, the generator having approximately equal torque output capacity as the engine based on connective gear ratio selection. An engine controller is utilized for managing the engine's operation thereby permitting the engine to be operated at a torque output level substantially equal to the maximum torque output of the generator without a significant margin of excess control capacity of the generator over the engine. An overpower condition is detected in which the torque output of the engine is surpassing the maximum torque output of the generator. The engine is controlled to a torque output that is less than the maximum torque output of the generator.

The general beneficial effects described above apply generally to the exemplary descriptions and characterizations of the devices, mechanisms and methods disclosed herein. The specific structures and steps through which these benefits are delivered will be described in detail hereinbelow.

BRIEF DESCRIPTION OF THE DRAWINGS

In the following, the invention will be described in greater detail by way of examples and with reference to the attached drawings, in which:

FIG. 8a is a schematic horizontal cross-sectional view of a battery for a hybrid electric vehicle according to one aspect of the present invention(s).

FIG. 8b is a schematic horizontal cross-sectional view of a traditional battery having cylindrically-shaped cells.

FIG. 8c is a schematic vertical cross-sectional view of a battery cooling system as depicted in FIG. 8a.

MODE(S) FOR CARRYING OUT THE INVENTION

As required, detailed embodiments of the present invention are disclosed herein; however, it is to be understood that the disclosed embodiments are merely exemplary of the invention(s) that may be embodied in various and alternative forms. The figures are not necessarily to scale; some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
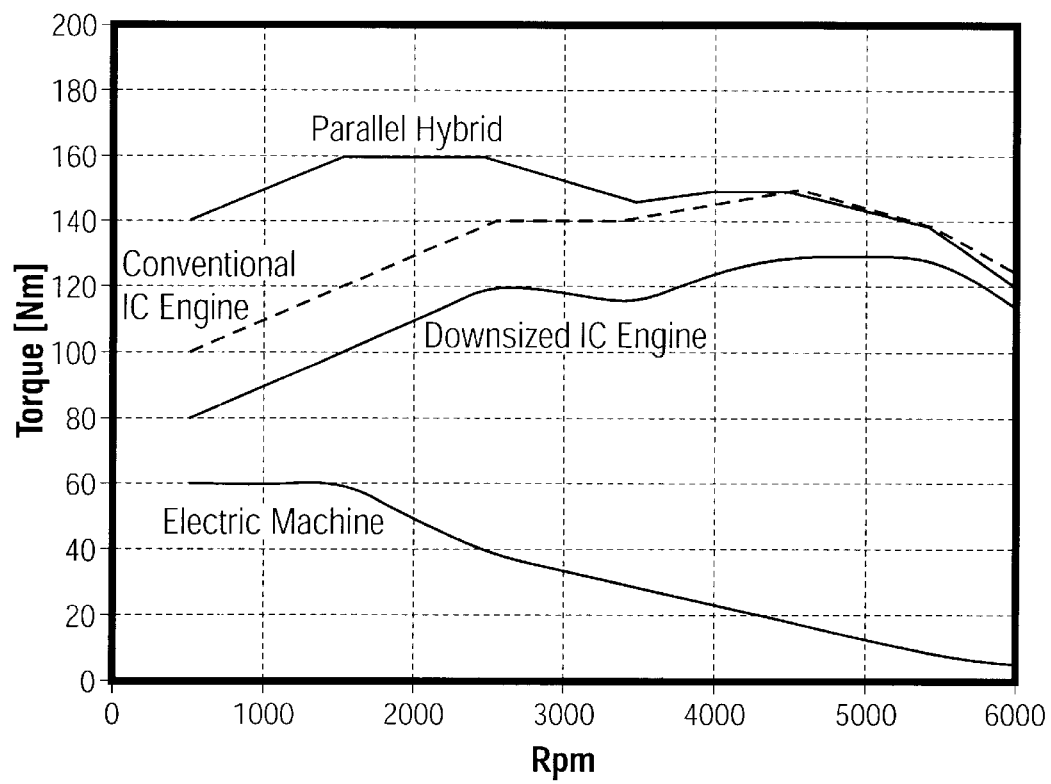
FIG. 1 is a graphical comparison of torque generated by a parallel hybrid and systems that have either an engine or motor.
Figure 2:
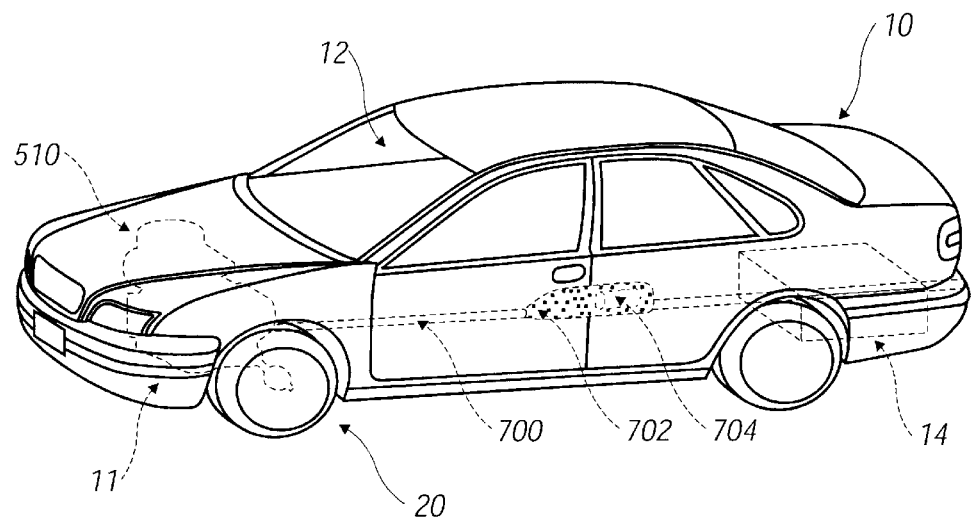
FIG. 2 is a perspective of a hybrid electric vehicle showing exemplarily system component locations on the vehicle.

As depicted in FIGS. 1 and 2, a hybrid electric transporting vehicle 10 has a power train system (having components generally designated with reference numbers from the 500's series) included therein for providing propulsion, as well as serving supplemental functions which are described in greater detail herein. Predominantly, the power train system is positioned in an engine room 11 located near a passenger compartment 12 of the vehicle 10. A battery compartment or housing 14, also positioned near the passenger compartment 12 holds one or more batteries 410. As will be appreciated by those skilled:in the art, the positioning of both the engine room 11 and battery housing 14 is not limited to the locations set forth in FIG. 2. For example, either may be positioned in front of, or behind the passenger compartment 12.

As depicted in FIG. 2, the overall systems architecture of the electric hybrid vehicle 10 comprises an engine system 510, including an internal combustion engine 511 (petrol, diesel or the like), that is mechanically connected by an output shaft system 520 to a transaxle system 530. The transaxle system 530 is further connected to a drive shaft system 540 utilized to rotate one or more drive wheels 20 that propel the hybrid electric transporting vehicle 10. In a preferred embodiment, the combustion engine 511 is controlled by an engine control module (ECM) or unit 220 which is capable of adjusting, among possible parameters, airflow to, fuel flow to and/or ignition at the engine 511. The engine 511 is mechanically connected via an output shaft 522 to the transaxle system 530. A planetary gear set 535 establishes interconnection between the engine 511 (via the output shaft 522), a generator 532, and the drive shaft system 540 (via the transaxle system 530). A motor 531 is also coupled to the drive shaft system 540, also possibly via the transaxle system 530.

Figure 3:
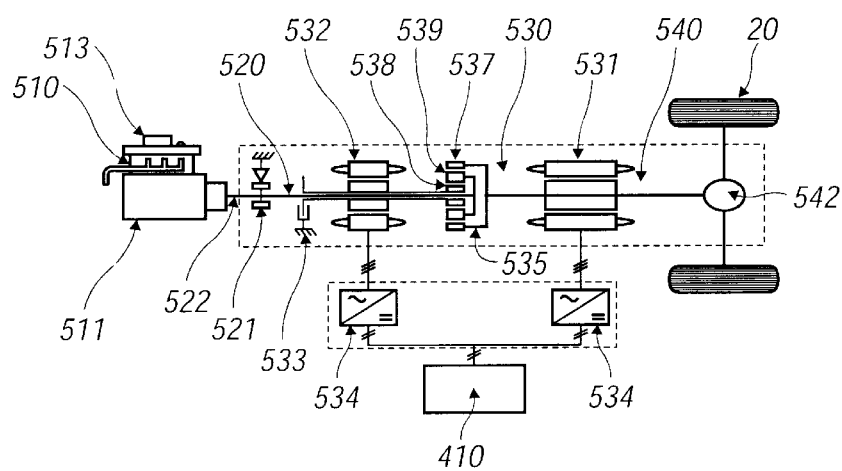
FIG. 3 is a schematic depicting the architecture of a power-split hybrid electric vehicle.
Figure 5:
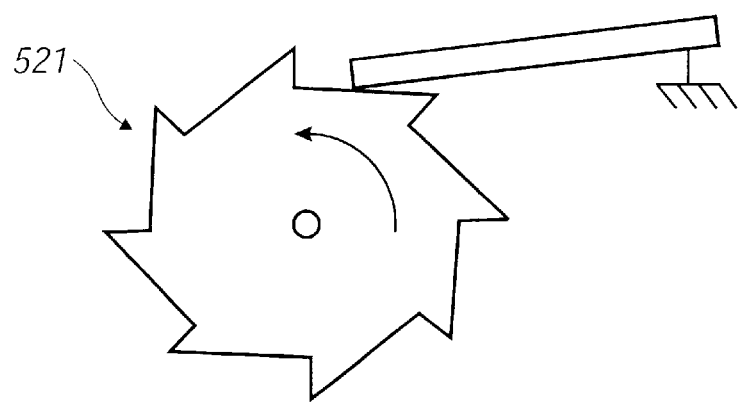
FIG. 5 is a simplified schematic view of a one-way clutch shown in FIG. 2.

In one embodiment, and which is illustrated in at least FIGS. 3 and 5, a one way clutch 521 is engageable with the output shaft 522, which in turn is connect to the engine 511 and to the planetary gear set 535. The function of the one-way clutch 521 is to limit the engine to being only a power/torque input to the planetary gear set 535, and with only one direction of rotation. Consequently, the one-way clutch 521 prevents power or torque from being transmitted from the planetary gear set 535 back to the engine 511.

Figure 4:
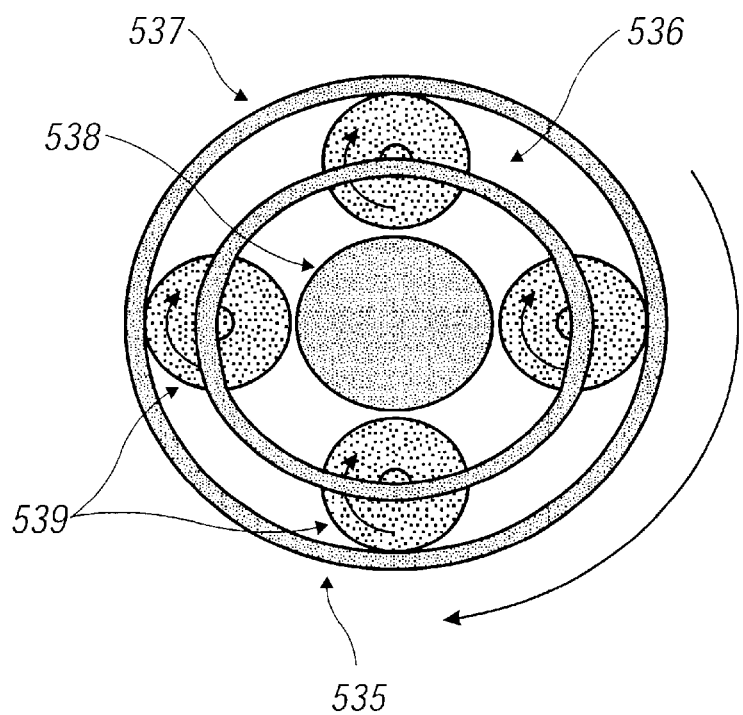
FIG. 4 is a cross-sectional schematic representation of a planetary gear set.

In another aspect, and as shown in FIG. 4, the planetary gear set 535 comprises a plurality of concentrically positioned planet gears 539 mechanically engaged between a perimeter region of a centrally located sun gear 538 and an interior surface of a ring gear 537. The individual gears that make up the plurality or set of planet gears 539 are fixed in positions relative to each other by a planetary carrier 536.

The generator 532 is mechanically connected to the sun gear 538 and is configured to convey rotational power and torque to and from the planetary gear set 535. In a preferred embodiment, the generator 532 is capable of being locked to prevent rotation of the sun gear 538 by a generator brake or lock-up device 533. As further contemplated by the present invention, the motor 531 is mechanically connected to the ring gear 537 and is configured to convey rotational power and torque to and from the planetary gear set 535. In a preferred embodiment, and as schematically shown in FIG. 3, the drive shaft system 540 is engagable with the motor 531 and effectively terminates at the drive wheel 20, via what can be a conventionally configured transmission/differential arrangement 542.

Figure 6:
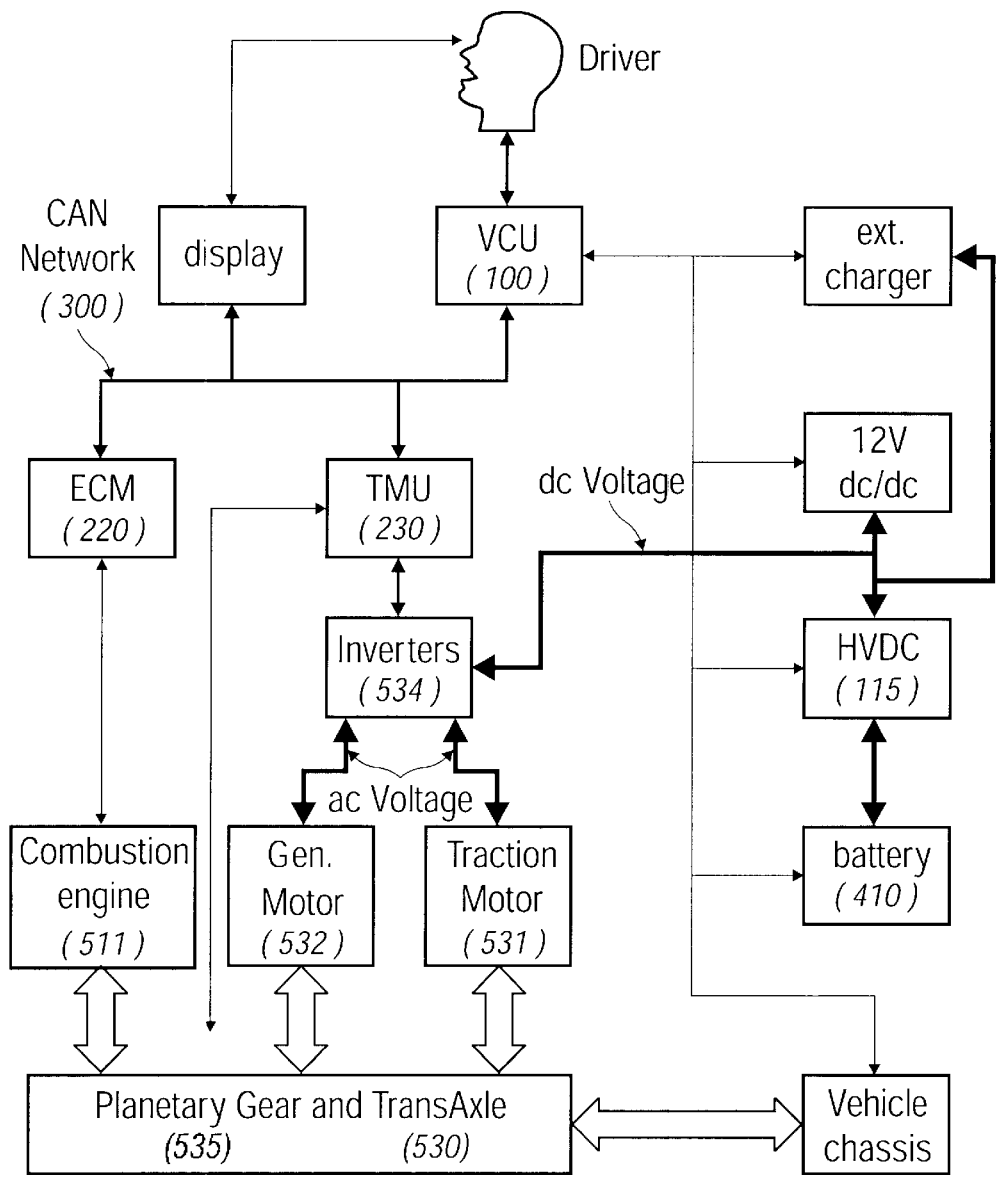
FIG. 6 is a schematic depicting control relationships between the various systems of a hybrid electric vehicle as coordinated utilizing the CAN.
Figure 6:
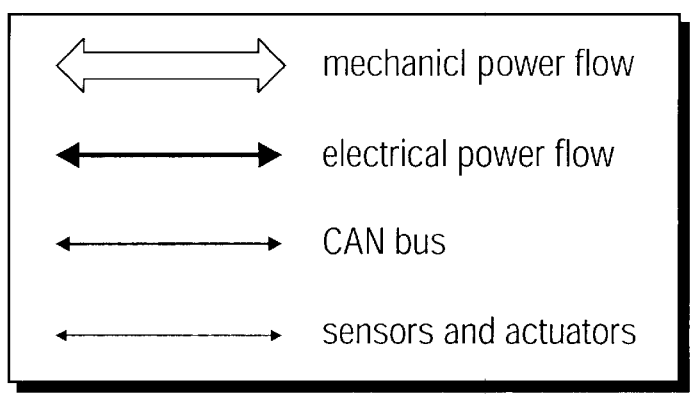
Figure 7:
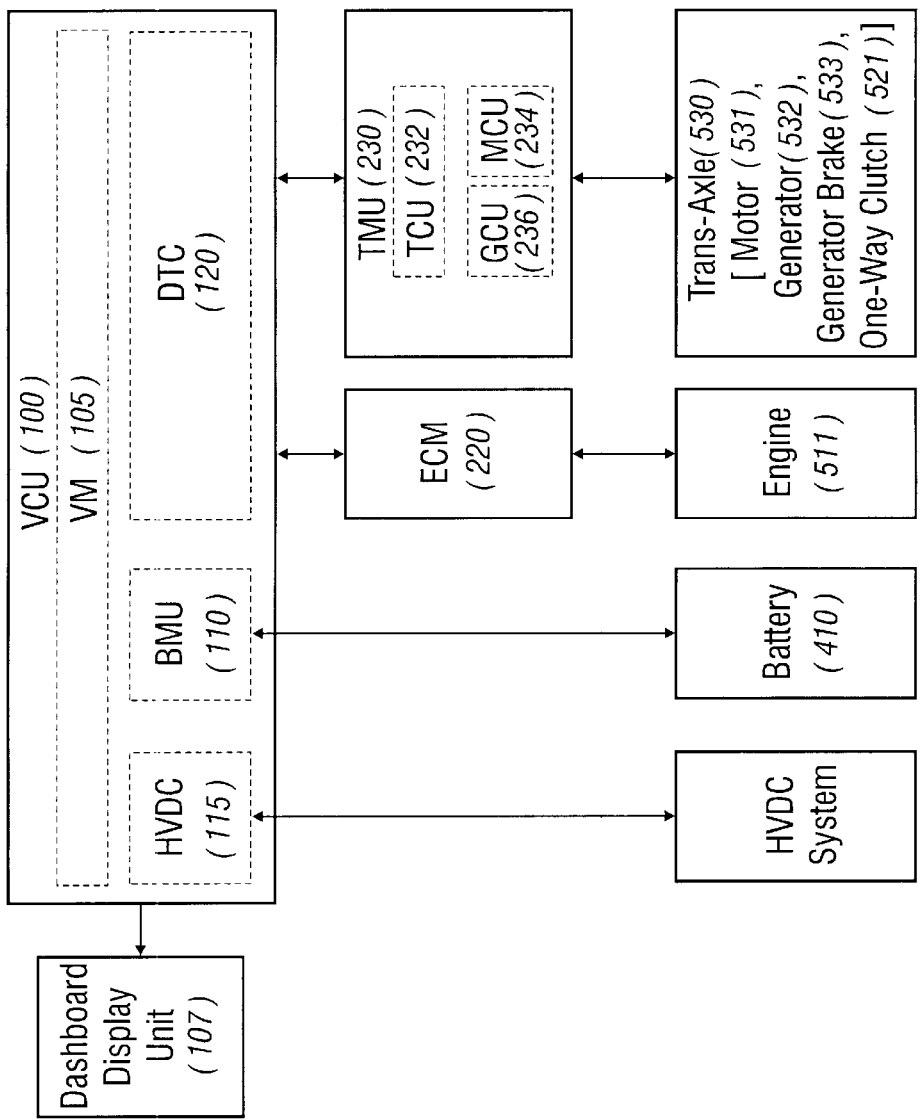
FIG. 7 is a functional schematic depicting the processes, tasks and controls of the various systems of the exemplary hybrid electric vehicle.

Based on the above disclosed system architecture, implementation of an energy management strategy, which is a focus of the hybrid electric vehicle 10, starts at a high level within a vehicle control unit or vehicle systems controller (VCU) 100 as schematically shown in FIGS. 6 and 7. The vehicle systems controller 100 is programmed with control strategies for the drive train system and battery system, as well as others. The vehicle systems controller 100 is responsible for interpreting driver inputs, coordinating the component controllers, and determining vehicle system operating states. The VCU 100 also generates commands to appropriate component sub-systems based on defined vehicle systems controller 100 functions, and sends those commands to the component controllers that, based thereon, take appropriate actions. The vehicle systems controller 100 also acts as a reference signal generator for the sub-system controllers. The vehicle systems controller 100 may take the form of a single, integrated microprocessor, or comprise multiple microprocessors that are suitably interconnected and coordinated.

A primary function of the vehicle systems controller 100 is to carry out vehicle mode processes and tasks (also known as the sequential control process), as well as make torque determinations, set reference values and perform energy management processes. Certain systems of the vehicle 10 are managed or monitored by a vehicle management (VM) unit or controller 105 which carries out sequential control processes, including ascertaining the position of the vehicle key and gear selector positioning, among others. It is at this level that certain inputs from the driver and conditions of the vehicle are synthesized for utilization as command inputs for sub-system controllers.

At the lower level of the VCU 100, three sub-component controllers are illustrated in FIG. 7. The first is a high voltage DC controller (HVDC) 115; the second is a battery management unit or controller 110 (bbb); and the third is a drive train controller 120 (DTC). As indicated above, certain inputs and processes are taken from the driver and the vehicle's systems at the vehicle management unit 105. Conversely, certain outputs relevant to the driver will be transmitted and displayed at the dashboard display unit 107 from the VCU 100 or the VM 105.

The HVDC 115 is responsible for coordinating operation of the high voltage components. The positioning of this controller is schematically shown in FIG. 6. The HVDC contains contactors or breakers which are normally positioned to an open configuration that prevents electricity from flowing thereacross. But when called on to take action and engage the battery 410, for instance when starting of the engine 511 is required, these contractors (usually a pair) close completing an appropriate connective circuit.

As shown in FIG. 6, the HVDC serves as a shield or buffer between the high voltage battery 410, and the inverters 534, as well as other auxiliary loads run off of the electric power of the battery 410. An example of such a high voltage auxiliary load may include an electrically run air-conditioning compressor system. In order to act as such a buffer, the high voltage output from the battery 410 must be relatively slowly "brought-up" to operating levels at the inverter 534 and/or auxiliary loads. In order to accept this "run-up" of the voltage, relatively small capacity contactors are initially closed that cause voltage from the battery to pass to a capacitor in either the inverter 534 or the appropriate auxiliary load, across a resistive circuit (a circuit containing buffering resistors). Once an appropriate pre-charge is built-up in the capacitor, primary contractors are then closed which complete the high voltage circuit between the batteries 410 and the capacitor contained within the receiving component which may be exemplified by the DC to AC inverter(s) 534, or an auxiliary load such as an electric air-conditioning system as indicated hereinabove. In this manner, a potentially damaging high voltage is prevented from being introduced too quickly to the receiving components.

The HVDC 115 also carries out certain diagnostic functions regarding the components of the HVDC 115, such as the contactors within the HVDC 115 itself, and also possibly the several systems interconnected through the HVDC, such as the battery 410, the inverters 534, or an electrically driven air-conditioning compressor which has not been illustrated in the Figures. Among other parameters, these diagnostics may be performed based on measurements of voltage and/or current.

The HVDC 115 also provides interconnection between an exterior charger connection (see ext. charger in FIG. 6), thereby allowing the battery 410 to be "plugged-in" for charging from an external power source.

The battery management controller (BMU) 110 handles control tasks relative to the battery system 410. Among other characteristics, the BMU 110 can estimate and measure state-of-charge (SOC) levels, and voltage and current parameters. It can also sense/determine and maintain maximum and minimum voltage and current levels with respect to the battery 410. Based on these determinations or sensed quantities/qualities, the VM 105, via such control modules as the DTC 120, can direct certain operations for affecting changes in the SOC of the battery 410. Other characteristics which may be monitored include operating temperature(s) of the battery 410, and voltages at the individual battery cells 412. Similarly, pressure within the cells 412 can also be monitored. Failures may be detected and reported, at least back to the VCU; but there is also the possibility of the information being passed to the operator via the dashboard display unit 107.

The DTC 120 makes the mode selection under which the several powering components will cooperate. That includes choices between parallel and split modes, as well as positive and negative split modes. The operational points for the several components of the drive train are also specified by the DTC 120. Still further, reference values are provided by the DTC 120 for the several sub-systems, including the transaxle management control modules or unit (TMU) 230 and the engine control module or unit (ECM) 220. From among the possible settings established by the DTC 120, battery charging/discharging mode is a possibility, as well as specifying whether the generator 532 and/or motor 531 should be used in their powering capacity as a motor, or their generating capacity as a generator. Torque references for the generator and motor are also issued from the TMU 230.

As a sub-component under the TMU 230, the transaxle control unit TCU 232 handles the transaxle 530 with respect to torque compensation when starting and stopping the engine 511. The TCU 232 uses and controls two slave processors characterized as a generator control unit GCU 236 and a motor control unit MCU 234. The GCU 236 handles the current and torque control of the generator 532; typically, via the inverter 534. The GCU 236 receives its torque and speed reference information from the TCU 232 as its immediate controller. The TCU 232 receives a total torque reference for the transaxle 530 and the speed reference value for the engine 511, together with mode reference information regarding cooperation between the engine 511 and generator 532; such as, whether parallel-, positive-split, or negative-split mode configurations will be assumed. The TCU 232 generates the torque reference parameters for the generator 532 and motor 531, each of which are implemented under the control of the GCU 236 and MCU 234, respectively. The specified torque settings are accomplished by controlling the current provided,to the respective generator/motor controllers 236,234.

Based on a map of optimal engine torque vs. speed curves, engine speed and torque are selected by the DTC 120 so that the engine system 510 can deliver the desired engine power and simultaneously lie on one of the engine's optimized efficient curves. If the DTC 120 determines that the speed of the engine 511 is too low for efficient operation, then the engine 511 is turned (or left) off by the engine control unit 220. If the power train control module 120 determines that the speed of the engine 51 is too high to be controlled by the generator 532 (based on SOC and generator limitations), the engine 511 is set to a slowed operational speed by the ECM 220.

Once the speed, torque and power of the engine 511 are determined by the vehicle systems controller 100, particularly at the DTC 120 of the controller 100, then the DTC 120 further determines the required speed and torque of the generator 532 to control the engine 511. The DTC 120, using this information, then determines the required speed and torque of the motor 531 to meet the difference, if any, between driver power (torque) demand and the engine power (torque).

Torque determination and monitoring is also carried out at the VCU 100. This function further ensures that torque delivered to the drive wheel(s) 20 is substantially equal to the torque (acceleration) demanded by the driver. The VCU 100 also monitors and controls the torque from the engine 511 and transaxle system 530 by comparing a sensed torque against the torque demanded by the driver. Torque management by the VCU 100 interprets driver inputs and speed control demands to determine regenerative brake torque and desired output shaft torque.

From the VCU 100, commands and references are distributed over a controller area network (CAN) 300 to component controllers generally referenced herein utilizing reference numbers in the 200's series. As indicated above, these controllers include the ECM 220 and the TMU 230 that together control the power train system to achieve efficient energy management, partition torque, determine engine 511 operating point(s), and decide on, and coordinate engine 511 start/stops. Commands and references from the VCU 100 to a series regenerative brake controller determine regeneration torque limitations, desired regenerative torque and zero vehicle speed control.

Finally, if and/or when individual system components are rendered inoperative, such as the motor 531 becomes disabled, the VCU 100 is configured to provide limited operating control over the power train system to allow the hybrid engine vehicle 10 to "limp" home.

As shown in FIG. 8a, a compact battery system 400 is made up of a number of elongate battery cells 412, each cell 412 having a longitudinal axis and a hexagonal cross-section shape in a plane oriented substantially perpendicular to the longitudinal axis. Each cell 412 is parallelly oriented to each other within a battery housing 14. As shown in FIG. 8a, the plurality of cells 412 are arranged in a honeycomb configuration with opposed faces of adjacent cells 412 proximately located one to the other in face-to-face relationship. One or more hexagonally shaped cooling channels 442 are located at an interior location(s) amongst the plurality of battery cells 412. As appreciated by those skilled in the art, a significant amount of volume is unused and wasted in battery compartments configured to hold traditional cylindrical battery cells as is exemplarily depicted in FIG. 8b.

Furthermore, the traditional cooling system often requires the use of a system of fluid filled pipes to cool a fraction of the cylindrically shaped battery cells curved exterior surface. In contrast, the battery cooling system 440 for the hexagonal battery cells 412, as depicted in FIG. 8a, presents a greater surface area for heat exchange to take place.

In another aspect of the system 440, and as is shown in FIG. 8c, a thermally radiative cap 443 is in fluid communication with one or more of the cooling channels 442 which is filled with a cooling fluid 445 that circulates between the cap 443 and the channels 442 to cool the battery cells 412. The cooling fluid 445 may consist of water maintained under a vacuum so that it boils at approximately 40° centigrade. Circulation of the fluid, as well as transformation between the gaseous and liquid states, occurs because of the temperature differential between the warmer lower area among the battery cells 412 and the cooler upper area with the cap 443. Exemplarily, this temperature of vaporization or boiling advantageously falls between these warmer and cooler temperatures.

An air circulation system cools the battery arrangement by drawing air through an air inlet exposed to the passenger compartment 12 and directs the air along a circulation path that crosses the radiative cap 443. The temperature of the air drawn from the passenger compartment 12 is normally in a range suited for passenger comfort, a temperature normally well below 40° centigrade. The intake may also pull air from outside the vehicle if ambient conditions are favorable. Air source selection may be easily accomplished using a flap-style valve common in other air duct environments.

After traversing the circulation path, the cooling air is most preferably discharged away from the passenger compartment 12 to avoid circulation and the introduction of heat and potentially airborne contaminants into the passenger compartment 12 that may have been picked up from the battery system 400. The risk of this occurrence, however, is reduced significantly through this battery's 410 configuration in which the circulated air passes over the closed system of the battery and its housing, and not through or near the more hazardous chemical cells 412.

To further promote cooling, the radiative cap 443 may be configured with a plurality of fin-type members 444 that extend from an exteriorly exposed surface thereof for enhancing thermal discharge of heat from the cap 443 to air circulated across the fins 444.

In another aspect, the disclosed invention(s) include a method for potentiating an engine's 511 power contribution to a hybrid electric vehicle's 10 performance in a take-off operating condition. Normally, fuel injection to, and ignition at the engine 511 are only commenced when the engine 511 is operating at a speed exceeding the resonance speed of the drive train to reduce engine start harshness; such resonance speeds of the drive train being dictated, at least in part, by transmission backlash, softness and the like. During high driver acceleration demands, however, ignition and the injection of fuel is desirably started as early as possible to potentiate output power and acceleration. The present method amends this typical operation and includes initiating take-off acceleration of the vehicle 10 exclusively using the motor 531, predicting the future demand for an engine's 511 power contribution to the vehicle's 10 immediate future power demand during the take-off acceleration, and starting the engine 511 at the time that the determination is made of future demand for the engine's 511 power contribution during the take-off acceleration. This full take-off control method or process further includes making the prediction of future demand at the initiation of take-off acceleration and/or increasing the speed of engine 511 operation as rapidly as predetermined operating efficiency parameters permit. The full take-off control method which increases the speed of engine 511 operation as rapidly as predetermined operating efficiency parameters permit may also include a step of allowing the increase in speed of engine operation to progress to a predetermined peak efficiency rate and diverting excess power from the engine 511 to the generator 532 that generates electricity with the diverted power. This full take-off control method which increases the speed of the engine 511 operation as rapidly as predetermined operating efficiency parameters permit, may also include a step of allowing the increase- in speed of engine 511 operation to progress to a predetermined peak efficiency rate which enables exclusive utilization of the engine 511 to meet the entirety of the vehicle's 10 future power demand and reducing the motor's 531 contribution to the power supplied to the vehicle 10 so that no excess power above demand is supplied by the engine 511.

In still a further aspect, the present invention provides a process or method for maintaining a catalyst 702 of an emissions system 700 in a hybrid electric propulsive system in an operative state. The method calls for sensing that the engine 511 has stopped operating. A time period is then predicted after which the catalyst 702 will cool down below a temperature (also known as a light-off temperature) at which the catalyst becomes ineffective. Pursuant thereto, the engine 511 is restarted when the time period has expired or lapsed, thereby maintaining the catalyst 702 at temperatures in excess of the light-off temperature, regardless of whether power is need from the engine 511 at that time. Predicting the time period after which the catalyst 702 will cool down takes into consideration known qualities of the catalyst 702 and ambient conditions in which the hybrid electric vehicle 10 is being operated. Such known qualities of the catalyst 702 include, but are not limited to, heating and cooling characteristics of the catalyst 702, life expectancy of the catalyst 702, and age of the catalyst 702. Relevant ambient conditions in which the vehicle 10 is being operated include, but are not limited to, weather and environmental conditions such as temperature, humidity and contaminant loads, as well as traffic conditions and road conditions. As an example, if driving is occurring in hilly terrain, this can be sensed as a cyclical demand for engine power for recurring uphill climbs. If this is quantified, it may be considered in the control parameter as a predictable occurrence. Additionally, the system may take into account sensed or "learned" driver habits or performance for predicting purposes which can include the a particular driver's demand for power is cyclical or otherwise patterned. This may be typified by some drivers' bad habit of repeatedly accelerating to a speed, and then subsequently slowing therefrom. When the decrease in speed is realized by the driver, rapid acceleration is then demanded for again setting the desired travel speed. If the control system "learns" such a pattern, it may be utilized in the predicting or calculating process for maximum elapse time before the catalyst excessively cools.

This method for maintaining the exhaust catalyst 702 in an operative condition may also include sensing the catalyst's 702 temperature and initiating operation or stopping of the engine 511 when a predetermined temperature is detected. Because of the hybrid's 10 characteristics, the catalyst maintenance process may further include running the engine 511 at idle speed when temperature elevation is required and charging the batteries 410 with the power produced from the idling engine 511. An alternative aspect to this process calls for heating the catalyst 702 to a predetermined temperature differential above the light-off temperature and then stopping operation of the engine 511 when the predetermined temperature differential is achieved. Engine operation is stopped when the predetermined temperature differential is detected by a temperature sensor 704 monitoring the temperature of the catalyst 702 or is predicted by a catalyst temperature model.

Figure 9:
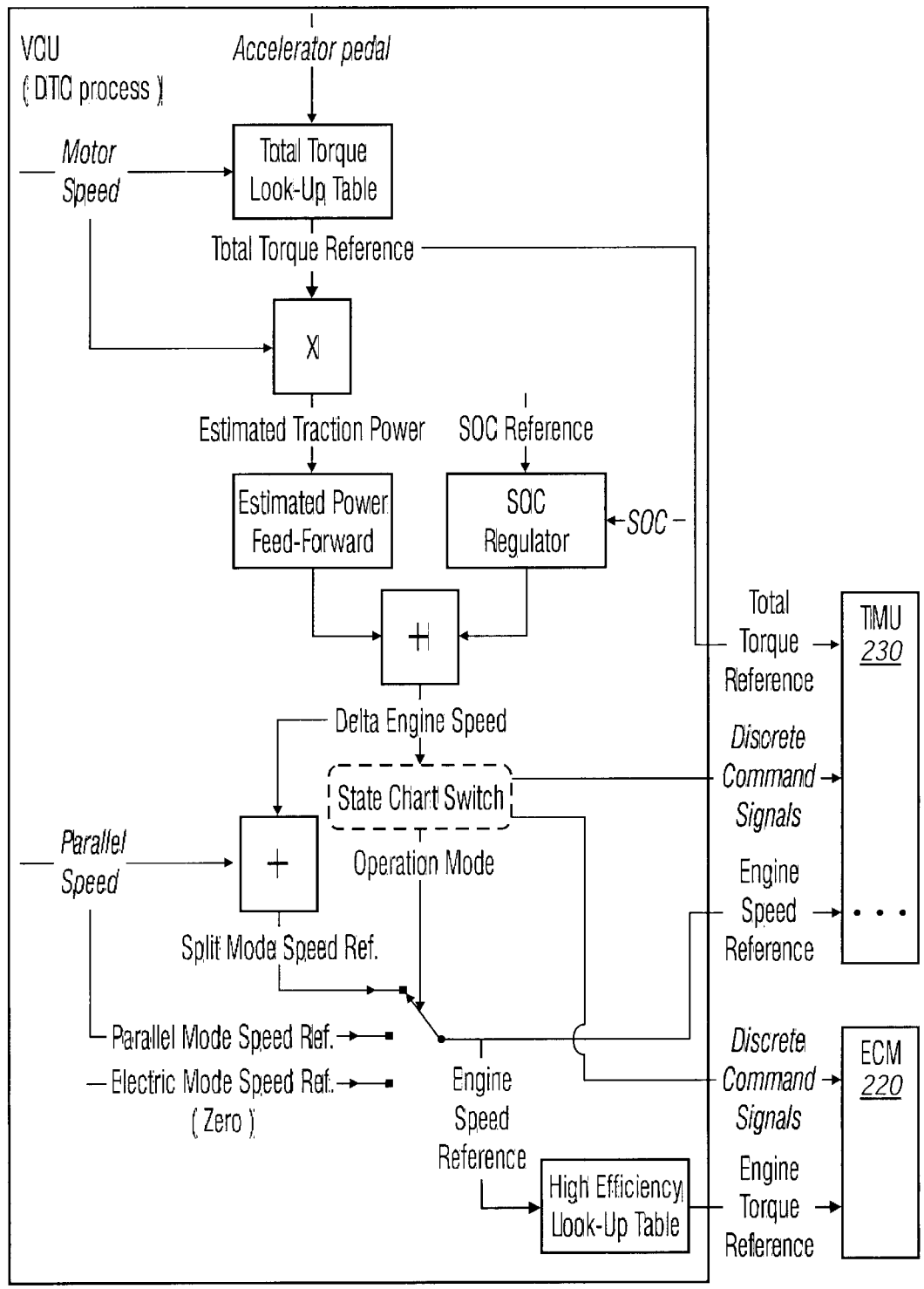
FIGS. 9 and 10 schematically illustrate a method for minimizing driver perceptible drive train disturbances during take-off in a hybrid electric vehicle.
Figure 10:
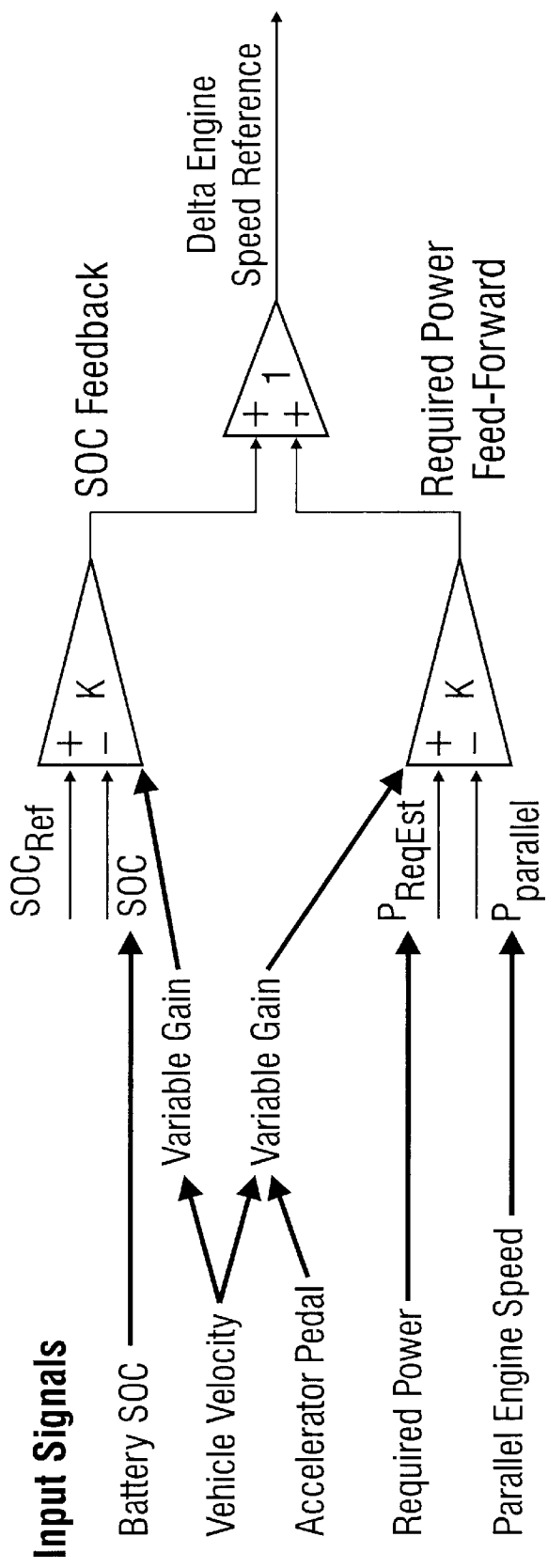

A method for minimizing driver perceptible drive train disturbances during take-off driving in a hybrid electric vehicle 10 when maximized power is often desired is also described herein. The concepts of this method are illustrated in FIGS. 9 and 10. The method includes sensing an actual state-of-charge (SOC) value of the battery 410 in a hybrid electric vehicle 10 and a traveling velocity of the vehicle 10 during take-off operation. The sensed actual SOC value is compared with a SOC reference value and a delta SOC value is computed as a difference therebetween. A velocity-based SOC calibration factor corresponding to the traveling velocity of the vehicle 10 is obtained from a look-up table maintained in the control system. A combination of the delta SOC value and the SOC calibration factor are utilized as a SOC feedback engine speed control instruction to the engine control unit (ECM) 220 of the hybrid electric vehicle 10. A driver's desired vehicular acceleration based on accelerator position is also sensed. A maximum possible engine power generatable at the sensed vehicle speed is determined, as is a required power value from the power train of the vehicle to meet the driver's desired vehicular acceleration. The maximum possible engine power generatable at the sensed vehicle speed is compared with the required power value and a delta power train requirement value is computed as a difference therebetween. A velocity-based and accelerator position-based power calibration factor corresponding to the traveling velocity of the vehicle and the accelerator position is determined from a second look-up table. A combination of the delta power train requirement value and the power calibration factor is utilized as a power requirement feedforward engine speed control instruction to the engine controller 220 of the hybrid electric vehicle 10.

The combination of the delta SOC value and the SOC calibration factor is by multiplication, as is the combination of the delta power train requirement value and the power calibration factor is by multiplication.

In a separate or enhancing aspect of the method outlined immediately above, a take-off vehicle operating condition is detected in which maximized power is likely to be demanded from the drive train of the hybrid electric vehicle 10. A sensed SOC discharge condition during the take-off operation due to motor utilization of battery power is prevented from triggering a battery charging condition which would reduce engine torque available to power the drive train of the vehicle 10. Alternatively, and/or additionally, immediate acceleration of the engine's 511 operation beyond an optimized operational speed in anticipation of an actual maximized power demand is initiated. Still further, a command may be issued from a generator controller (GCU) 236, responsive to a sensed SOC discharge condition, instructing immediate acceleration of the engine's 511 operation beyond an optimized operational speed thereby minimizing discharge of the battery 410 or commencing recharge of the battery 410.

A preferred SOC reference value, of exemplarily, but not necessarily, fifty percent of battery 410 total charge capacity, is utilized in at least one embodiment of the invention; on others, a more lenient range of forty to sixty percent of battery total charge capacity may be observed.

In another aspect, the invention takes the form of a method for optimizing the operational efficiency of a hybrid electric vehicle 10. The method includes operating an engine 511 of a hybrid electric vehicle 10 preferentially on an optimized power curve of the engine 511 for maximizing the efficiency of the engine 511. A state-of-charge (SOC) condition of a battery 410 of the hybrid electric vehicle 10 is sensed and constitutes a preferential value indicative of no additional charging being desired. At cruising, however, the engine power output in parallel mode is too large along the engine's 511 optimized power curve, particularly in view of gear ratios set by acceleration requirements. Instead of using negative-split mode and suffering the inherent losses of that configuration, the running torque of the engine 511 in parallel mode is reduced to a level below the optimized torque curve to a point that the power produced by the engine 511 is substantially equal to the power demanded for driving the hybrid electric vehicle The reduction in engine torque is affected by adjusting airflow to, fuel flow to and/or ignition parameters of the engine 511.

The drive train of the hybrid electric vehicle 10 is thus reconfigured from a negative power-split mode in which engine power is split through a planetary gear arrangement 535 between the drive wheels 20 and the generator 532 to a parallel mode in which the generator 532 is locked and all engine power is output to the drive wheels 20 of the hybrid electric vehicle 10 through the planetary gear arrangement 535. This parallel mode, but with reduced and non-optimized engine operation, is used when efficiency is higher in this mode than if using negative split,mode for the same torque output.

As a goal, the time spent in negative power-split mode is minimized and time spent in parallel mode is maximized. Utilization of the generator to motor the engine 511 to a slowed operational speed is avoided using this process thereby avoiding sequential charge and discharge cycles through the drive train components of the hybrid vehicle. Energy losses in the power train of the hybrid electric vehicle 10 are therefore reduced by avoiding charge and discharge of the hybrid electric vehicle's battery system 400. Cooling requirements for the hybrid electric vehicle's battery 410 are also reduced since battery losses are decreased.

In yet another aspect, the present invention takes the form of a method for calibrating and synchronizing sensed operating torques of the engine 511 and the generator 532 in a planetary gear based hybrid electric vehicle 10. The method includes providing a sensor that detects the operational torque of the engine 511 at the engine's interface with the planetary gear system 535 (power-split hybrid drive train) of the hybrid electric vehicle 10. A sensor is provided that detects the operational torque of the generator 532 at its interface with the planetary gear system 535 of the hybrid electric vehicle 10. The planetary gear system 535 of the hybrid electric vehicle 10 is operated in the split mode so that the generator 532 is directly linked to the engine 511 and a reading of the sensor that detects the operational torque of the generator 532 may also be used to compute the operating torque of the engine 511. Paired values of sensed operational speeds of the engine 511 and the generator 532 at like times are recorded. Each pair of recorded values is arithmetically processed and a calibrating value therebetween is computed. The sensing and recording of paired values at the same sensed generator and engine operation points is repeated thereby enabling the calculation of computed average calibrating values at each of the particular sensed generator and engine speeds and torques suitable for subsequent utilization in computing correlating engine torques in the future. The engine 511 and the generator 532 are controlled utilizing the average calibrating value at future times of transition between power-split mode and parallel mode of the planetary gear system 535 so that the engine torque is substantially matched with the generator torque at the time of direct linkage across the planetary gear arrangement (i.e., when releasing generator lock-up), thereby avoiding driver detectible irregularities or harshness in the performance of the power train of the hybrid electric vehicle 10.

The predictability of the relationship between the engine 511 and generator 532 in the parallel mode is based on gear ratios that remain substantially unchanging.

Contemporaneously measured values of complementary operating parameters of the hybrid electric vehicle 10 may also be recorded for each pair of recorded values of sensed operational torques of the engine 511 and the generator 532 to be used supplementally in the torque matching process.

To maintain trueness, the average calibration value is permitted to be varied by a limited maximum value with respect to time so that anomalous disturbances do not significantly impact the computed average calibration value. The updating of the computed average calibration value for a particular generator sensed speed is ongoing, and continuous thereby continually improving the quality of the average calibration value for that particular generator sensed speed.

The irregularities to be avoided are manifest as jerking motions induced in the hybrid electric vehicle 10 by the planetary gear system 535. Customization of the computed average calibration value to an individual vehicle is enabled via the invention in the presently disclosed embodiment since histories are taken, maintained, and considered in the matching process.

Referring to FIGS. 11–15, yet another aspect of the present invention is disclosed. This aspect takes the form of a method for potentiating the utilizable torque output capacity of a hybrid electric vehicle 10. The method includes controlling operation of the engine 511 of the hybrid electric vehicle 10 using the generator 532, the engine 511 and generator 532 being interconnected through the planetary gear system 535. The generator 532 has approximately equal torque output capacity as the engine 511 when connecting gear ratios are considered. An engine controller 220 is utilized for managing the engine's 511 operation thereby permitting the engine 511 to be operated at a torque output level substantially equal to the maximum torque output of the generator 532 without a significant margin of excess control capacity of the generator 532 over the engine 511. An overpower condition is detected in which the torque output of the engine 511 is surpassing the maximum torque output of the generator 532. Responsively, the engine 511 is controlled to a torque output that is less than the maximum torque output of the generator 532.

The method continues by rechecking for a continuation of the engine overpower condition and shutting the engine 511 down if the control actions are not sufficient and a continuing overpower condition is detected. In this manner, generator and engine over-speed is avoided.

By this process, total utilizable capacity of the hybrid electric vehicle's power plant is optimized by enabling running the engine 511 at substantially maximum capacity where greatest torque is produced therefrom.

Available take-off torque in the hybrid electric vehicle 10 is optimized by running the engine 511 at substantially maximum torque capacity together with a commensurately sized, but not oversized, generator 532 with respect to relative torque capacities. Torque output of the engine 511 and the generator 532 are calculated based on detected operational speeds of the engine 511 and the generator 532, respectively. Speed error may be calculated utilizing one or two sensors.

In a supplemental embodiment of this general control concept, a command is issued to increase the torque output of the generator 532 responsively to detection of an engine 511 over power condition. A check for the continuation of the engine overpower condition is repeated. Then again, a continuing overpower condition may be detected in which the torque output of the engine 511 continues to surpass the torque output of the generator 532 and a supplemental command is issued to again increase the torque output of the generator 532. Again, the check for a continuation of the engine overpower condition is repeated. Ultimately, the engine torque is reduced back to a torque output that is less than the torque output of the generator 532 when repeated checks, of a predetermined number, each detects an overpower condition in which the torque output of the engine 511 surpasses the torque output of the generator 532.

In yet another embodiment of this same basic concept, the method includes detecting an overpower condition in which the torque output of the engine 511 is surpassing the maximum torque output of the generator 532; the engine 511 is responsively controlled to a maximum torque output set at a value less than the maximum torque output of the generator 532.

Figure 11:
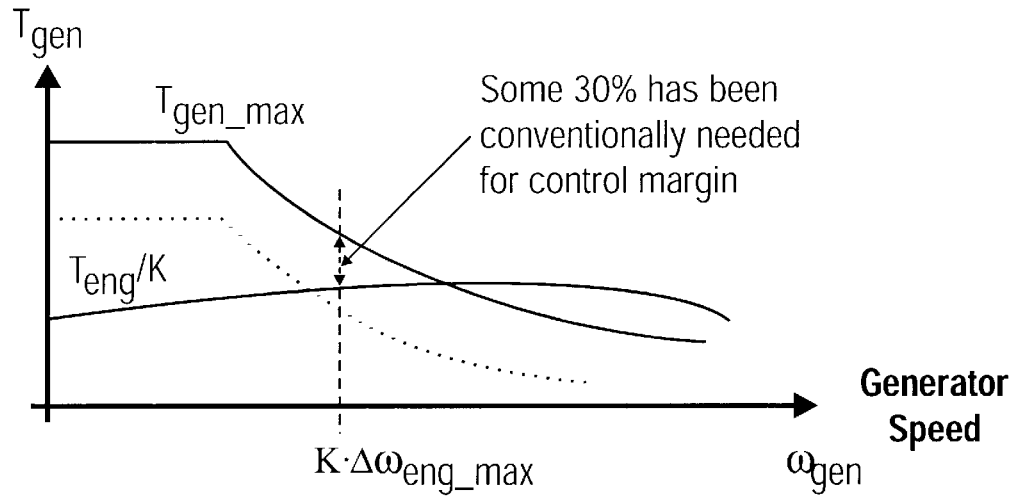
FIGS. 11 through 15 schematically illustrate a method for potentiating the utilizable torque output of a particularly sized engine in a hybrid electric vehicle.
Figure 12:
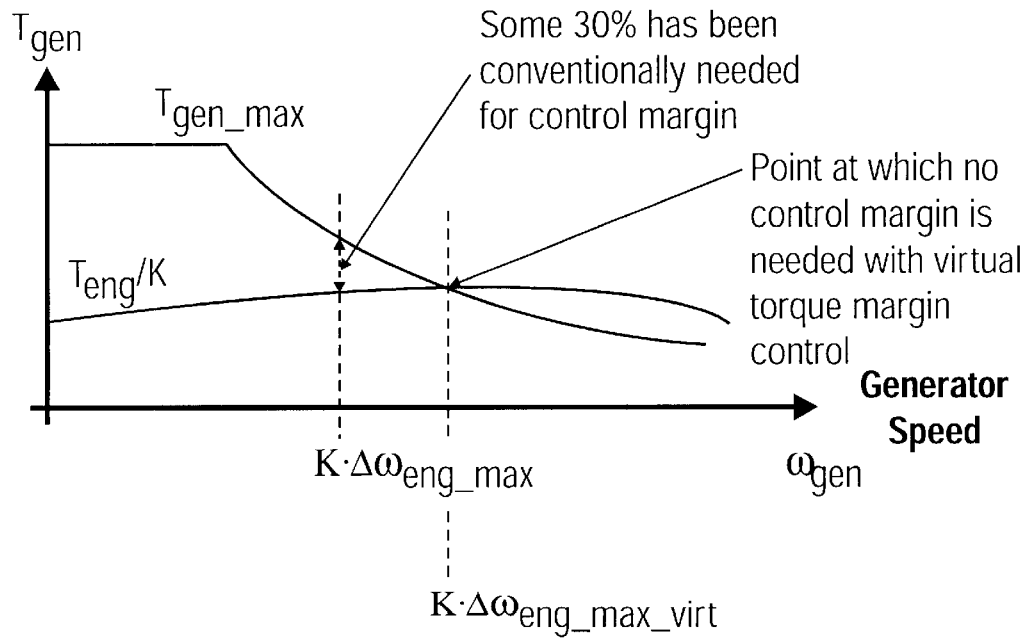

Referring now with greater specificity to the drawings, FIGS. 11 and 12 comparatively illustrate the present method of control which enables the elimination of a thirty percent (30%) "buffer" that has been conventionally provided between the torque capacities of the engine 511 and the generator 532; the necessity of this buffer resulting in the use of generators 532 significantly larger, or engines 511 significantly smaller than would otherwise be optimal since thirty percent of one of their capacities must be sacrificed to maintain the buffer margin for control, just in case it is needed. By otherwise controlling the engine 511 so that it can be assured that the capacity of the torque capacity of the generator 532 will not be exceeded, the approximately thirty percent of lost capacity can be exploited. Graphically this is shown in FIG. 12 where the speed ($\omega$), plotted on the x-axis, is equalized at the right side of the graph where the maximum torque of the generator ($T_{gen\_max}$) is equal to the torque of the engine 511 when the constant (K) representing the gearing ratio is considered ($T_{eng}$/K). The increase in useable speed, and in turn useable power (P=T×$\omega$), from both the engine 511 and generator 532 is represented by the distance moved to the right along the x-axis from the buffered position (K×$\Delta\omega_{eng\_max}$) to the "virtualized" position (K×$\Delta\omega_{eng\_max\_virt}$) where the buffer is virtual, and not actual, because of the control strategy exercised.

Figure 13:
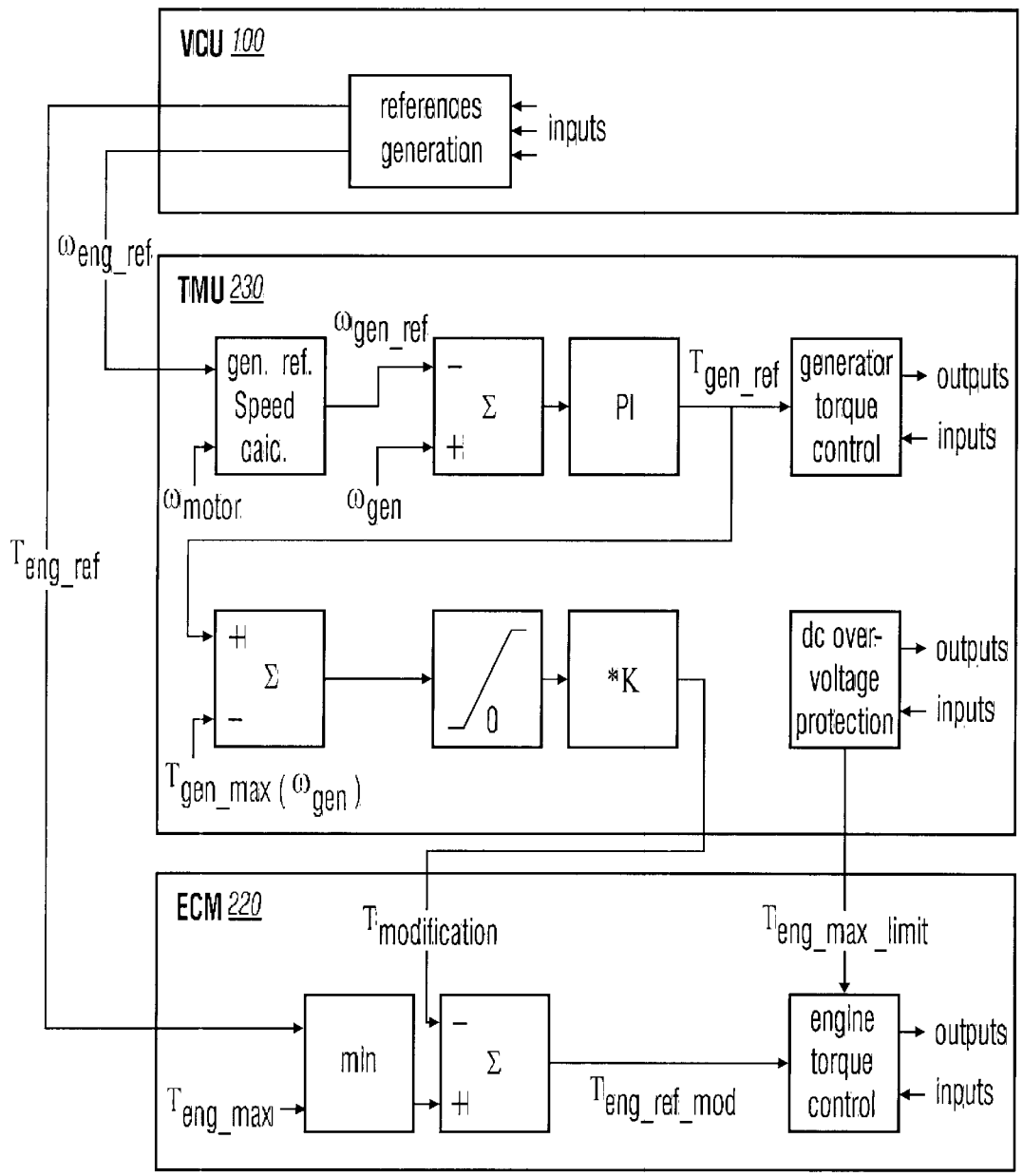
Figure 14:
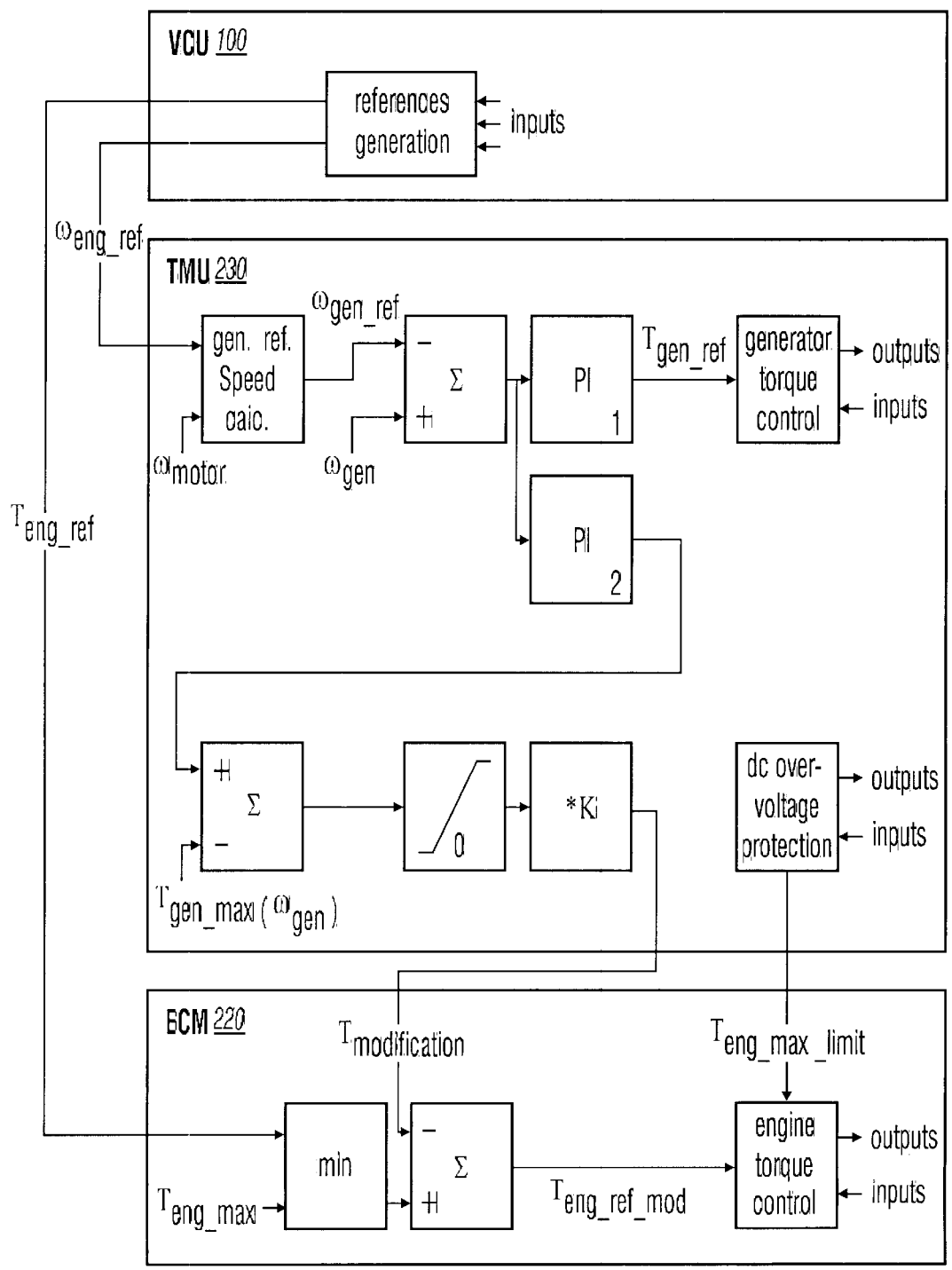
Figure 15:
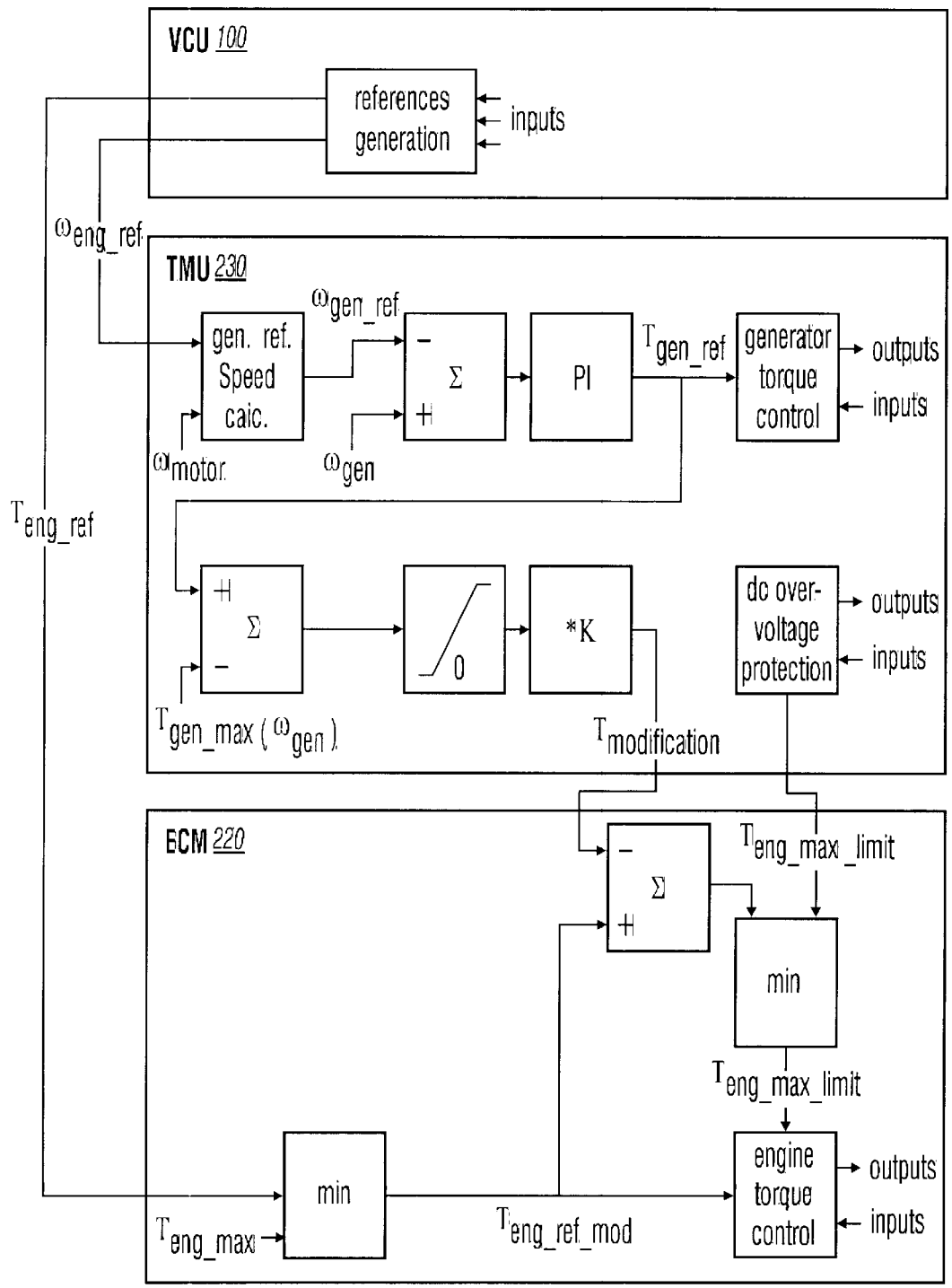

Referring now to FIGS. 13–15, the VCU 100 calculates an engine reference value ($\omega_{eng\_ref}$) and the TMU 230 receives that value and, together with a sensed speed of the motor ($\omega_{motor}$), taking into account the gearing ratio consequence, a generator reference speed ($\omega_{gen\_ref}$) is calculated and passed forward for comparison, by summation, with the actual generator speed ($\omega_{gen}$). The result of that comparison is then processed through a proportional integral controller (PI) for, among other things, amplifying the error value and "learning" error patterns that continue over periods of time based on historical values. The learning process is enabled by performing repetitive calculations. From the PI controller, a generator torque reference ($T_{gen\_ref}$) is derived. This reference is passed to the generator torque controller 236 for operational control purposes; i.e., by adjusting current, by adjusting voltage with is accomplished using pulse width modulation using transistors in the inverter (see FIG. 6). The same reference ($T_{gen\_ref}$) is further processed by subtracting therefrom the maximum torque capacity of the generator ($T_{genmax}(\omega_{gen})$). The sense, whether positive or negative, of this outcome is then determined; if negative, the maximum torque capacity of the generator has not been exceeded; if positive, the maximum torque capacity of the generator has been exceeded. If positive, the capacity of the generator is being exceeded. This positive value is then multiplied by the constant K to take into account the effect of the gearing ratio and thereby calculating a modification torque ($T_{modification}$).

To the ECM 220, an engine torque reference ($T_{eng\_ref}$) is supplied from the VCM 100. At the ECM 220, the engine torque reference ($T_{eng\_ref}$) is compared to the maximum torque of the engine ($T_{eng\_max}$). The smaller (min) of these two values is further processed by comparison with the modification torque ($T_{modification}$) which is subtracted therefrom producing a modified engine torque reference ($T_{eng\_ref\_mod}$). This reference ($T_{eng\_ref\_mod}$) is fed forward to the engine torque controller 220 for operational control purposes over the engine 511; i.e., for adjusting, among possible parameters, airflow to, fuel flow to and/or ignition at the engine 511. In practice, if the generator 532 has not been determined to be in a condition overpowering the engine 511 at the TMU 230, then the engine torque reference ($T_{eng\_ref}$) from the VCU 100 will be processed through to the engine 511. If, however, there is a torque modification value ($T_{modification}$) from the TMU 230 that is not zero, the engine 511 will be controlled to eliminate the condition in which the engine torque exceeds that of the generator 532.

A primary benefit of the above described arrangement is that a single controller, the TMU 230, provides both the ($\omega_{eng\_ref}$) and the ($\omega_{eng}$). This avoids the possibility of introducing errors that are attributable to mis-calibrations that can otherwise occur when multiple controllers are employed for similar purposes. Still further, a maximum engine torque limit ($T_{eng\_max\_lim}$) may be derived at the TMU 230 to provide dc over-voltage protection, but which is affected at the engine torque control unit 220.

In the embodiment illustrated in FIG. 14, two PI controllers are incorporated. In the embodiment of FIG. 15, the modified engine torque reference ($T_{eng\_ref\_mod}$) and the maximum engine torque limit ($T_{eng\_max\_lim}$) are rationalized to produce the maximum engine torque limit ($T_{eng\_max\_lim}$) that will be utilized by the engine torque controller 220.

Although the present invention has been described and illustrated in detail, it is to be clearly understood that the same is by way of illustration and example only, and is not to be taken as a limitation. The spirit and scope of the present invention are to be limited only by the terms of any claims presented hereafter.

What is claimed and desired to be secured by Letters Patent is as follows:

1. Arrangement for a compact battery and cooling system therefore, said arrangement comprising:
    a plurality of elongate battery cells, each battery cell having a longitudinal axis and a hexagonal cross-sectional shape in a plane oriented substantially perpendicular to said longitudinal axis;
    said plurality of elongate battery cells being parallelly oriented, each to the others, within a battery housing;
    said plurality of battery cells being arranged in a honeycomb configuration with opposed faces of adjacent battery cells proximately located one to the other in face-to-face relationship; and at least one substantially hexagonally shaped cooling channel provided at an interior location within said plurality of battery cells a thermally radiative cap arranged in fluid communication with said at least one substantially hexagonally shaped cooling channel; and said radiative cap and said at least one substantially hexagonally shaped cooling channel containing cooling fluid that circulates therebetween for cooling said plurality of battery cells.

2. The arrangement as recited in claim 1 wherein said at least one substantially hexagonally shaped cooling channel is a plurality of hexagonally shaped cooling channels arranged within said plurality of battery cells.

3. The arrangement as recited in claim 1 further comprising:

an air circulation system having an air inlet exposed to an exterior of a carrying vehicle for intaking air having a temperature in a range suitably low for absorbing heat from said radiative cap; and a circulation path that directs air drawn into said air circulation system through said air inlet across said radiative cap and way therefrom for cooling said battery cells.

4. The arrangement as recited in claim 1 further comprising:

an air circulation system having an air inlet exposed to a passenger compartment of a carrying vehicle for intaking air having a temperature in a range typically suited for passenger comfort; and a circulation path that directs air drawn into said air circulation system through said air inlet across said radiative cap and away therefrom for cooling said battery cells.

5. The arrangement as recited in claim 4 further comprising:

said air circulation system having an air exit ported to an exterior of the vehicle.

6. The arrangement as recited in claim 4 further comprising:

said radiative cap having a plurality of fins extending from an exteriorly exposed surface thereof for enhancing thermal discharge of heat from said radiative cap to air circulated across said fins.

7. The arrangement as recited in claim 6 further comprising:

said cooling fluid being water maintained under vacuum, said vacuum of sufficient magnitude to establish a boiling point of said water at a temperature below a predetermined level for potentiating the life of said battery.

8. The arrangement as recited in claim 7 further comprising:

said predetermined temperature at which said cooling fluid boils being approximately 40° centigrade.

* * * * *

UNITED STATES PATENT AND TRADEMARK OFFICE
CERTIFICATE OF CORRECTION

PATENT NO.    : 6,705,418 B2
DATED         : March 16, 2004
INVENTOR(S)   : Björn Wessman It is certified that error appears in the above-identified patent and that said Letters Patent is hereby corrected as shown below:

<u>Title page,</u>
Item [73], Assignee, change "Gothenburg" to -- Göteborg --.

Signed and Sealed this

Sixth Day of July, 2004

JON W. DUDAS
*Acting Director of the United States Patent and Trademark Office*